US012693142B2

(12) United States Patent
Li et al.

(10) Patent No.: US 12,693,142 B2
(45) Date of Patent: Jul. 28, 2026

(54) METHOD AND APPARATUS FOR GLOBAL PHASE IN-PHASE/QUADRATURE DEMODULATION OF OPTICAL FIBER DAS DATA

(71) Applicants: China National Petroleum Corporation, Beijing (CN); BGP Inc., China National Petroleum Corporation, Hebei (CN)

(72) Inventors: Yanpeng Li, Hebei (CN); Shaohua Zhang, Hebei (CN); Zhidong Cai, Hebei (CN)

(73) Assignees: China National Petroleum Corporation, Beijing (CN); BGP Inc., China National Petroleum Corporation, Hebei (CN)

( * ) Notice: Subject to any disclaimer, the term of this patent is extended or adjusted under 35 U.S.C. 154(b) by 349 days.

(21) Appl. No.: 18/576,899

(22) PCT Filed: Jun. 30, 2022

(86) PCT No.: PCT/CN2022/102915
§ 371 (c)(1),
(2) Date: Jan. 5, 2024

(87) PCT Pub. No.: WO2023/123970
PCT Pub. Date: Jul. 6, 2023

(65) Prior Publication Data
US 2024/0310191 A1     Sep. 19, 2024

(30) Foreign Application Priority Data
Dec. 30, 2021     (CN) .......................... 202111650237.0

(51) Int. Cl.
*G01D 5/353* (2006.01)
*G01H 9/00* (2006.01)

(52) U.S. Cl.
CPC ......... *G01D 5/35361* (2013.01); *G01H 9/004* (2013.01)

(58) Field of Classification Search
CPC ............ G01D 5/353; G01H 9/00; G01H 1/04; G01H 1/12; G01H 3/04; G01H 3/10;
(Continued)

(56) References Cited

U.S. PATENT DOCUMENTS 9,210,025 B2    12/2015  Lv
2012/0278043 A1*  11/2012  Lewis ..................... G01H 9/004
702/189
(Continued)

FOREIGN PATENT DOCUMENTS

CN         201025712 Y     2/2008
CN         102549994 A     7/2012
(Continued)

OTHER PUBLICATIONS

Yan Li et al. , "Phase Demodulation Methods for Optical Fiber Vibration Sensing System: A Review," Dec. 15, 2021, IEEE Sensors Journal, vol. 22, No. 3, Feb. 1, 2022,pp. 2305-2316.*
(Continued)

*Primary Examiner* — Omar S Ismail
(74) *Attorney, Agent, or Firm* — Sughrue Mion, PLLC

(57)        ABSTRACT

A method for global phase IQ Demodulation of optical fiber DAS data includes: acquiring initial optical fiber DAS IQ data from DAS instrument; determining a corresponding direct phase value based on the initial optical fiber DAS IQ data, performing an interrogation pulse phase correction operation on the initial optical fiber DAS IQ data based on the direct phase value to obtain first processed data; performing a receiving point initial phase correction operation on the first processed data to obtain second processed data; performing an interrogation pulse linear phase correction
(Continued)

operation on the second processed data to obtain third processed data; performing a receiving point linear phase correction operation on the third processed data to obtain fourth processed data; and performing phase unwrapping processing and de-near DC component processing on the fourth processed data to obtain global phase demodulated data.

9 Claims, 4 Drawing Sheets

(58) Field of Classification Search

CPC ........ G01H 11/02; G01H 11/06; G01H 11/04; G01H 11/08

See application file for complete search history.

(56) References Cited

U.S. PATENT DOCUMENTS

| | | | |
|---|---|---|---|
| 2014/0247912 A1* | 9/2014 | Lv ......................... H04L 27/364 375/348 |
| 2015/0114127 A1* | 4/2015 | Barfoot .................. G01H 9/004 73/655 |
| 2017/0045410 A1* | 2/2017 | Crickmore ............. G01K 11/32 |
| 2017/0052050 A1* | 2/2017 | Crickmore ........... E21B 47/135 |
| 2017/0183959 A1 | 6/2017 | Ellmauthaler et al. |
| 2017/0235006 A1* | 8/2017 | Ellmauthaler ......... G01V 1/226 702/6 |
| 2019/0025094 A1* | 1/2019 | Lewis ............... G01D 5/35361 |
| 2020/0370948 A1 | 11/2020 | Huang et al. |
| 2020/0408572 A1 | 12/2020 | Ronnekleiv et al. |
| 2020/0408574 A1 | 12/2020 | Waagaard et al. |
| 2022/0252435 A1* | 8/2022 | Calbris .................. G01D 5/353 |

FOREIGN PATENT DOCUMENTS

| | | |
|---|---|---|
| CN | 109297581 A | 2/2019 |
| EP | 2768193 B1 | 4/2016 |
| JP | 2021-139596 A | 9/2021 |

OTHER PUBLICATIONS

Ciming Zhou et al.,"Demodulation of a Hydroacoustic Sensor Array of Fiber Interferometers Based on Ultra-Weak Fiber Bragg Grating Reflectors Using a Self-Referencing Signal," Dec. 17, 2018, Journal of Lightwave Technology, vol. 37, No. 11, Jun. 1, 2019,pp. 2568-2571.*

Geoffrey A. Cranch et al.,"Efficient Fiber Bragg Grating and Fiber Fabry-Pérot Sensor Multiplexing Scheme Using a Broadband Pulsed Mode-Locked Laser," Jun. 10, 2005, Journal of Lightwave Technology, vol. 23, No. 11, Nov. 2005, pp. 3798-3806.*

Fan Cunzheng et al.,"Large Dynamic Range Optical Fiber Distributed Acoustic Sensing (DAS) With Differential-Unwrapping-Integral Algorithm," Sep. 8, 2021, Journal of Lightwave Technology, vol. 39, No. 22, Nov. 15, 2021,pp. 7274-7279.*

Fernando da Cruz Pereira et al.,"Real-Time Polarimetric Optical High-Voltage Sensor Using Phase-Controlled Demodulation," May 25, 2018, Journal of Lightwave Technology, vol. 36, No. 16, Aug. 15, 2018,pp. 3275-3280.*

Yonas Muanenda et al.,"Dynamic phase extraction in high-SNR DAS based on UWFBGs without phase unwrapping using scalable homodyne demodulation in direct detection," Apr. 2, 2019, Optics Express, vol. 27, No. 8,Apr. 15, 2019, pp. 10644-10654.*

Xin Lu et al.,"Evaluating Phase Errors in Phase-Sensitive Optical Time-Domain Reflectometry Based on I/Q Demodulation," Mar. 17, 2020, Journal of Lightwave Technology, vol. 38, No. 15, Aug. 1, 2020,pp. 4133-4139.*

Bing Qi et al.,"Quadrature phase-shifted optical demodulator for low-coherence fiber-optic Fabry-Perot interferometric sensors," Feb. 27, 2019, Optics Express, vol. 27, No. 5 , Mar. 4, 2019,pp. 7319-7326.*

J M De Freitas,"Recent developments in seismic seabed oil reservoir monitoring applications using fibre-optic sensing networks," Apr. 1, 2011, Meas. Sci. Technol. 22,pp. 1-26.*

International Search Report for PCT/CN2022/102915 dated Sep. 20, 2022.

Cunzheng et al., "Large Dynamic Range Optical Fiber Distributed Acoustic Sensing (DAS) With Differential-Unwrapping-Integral Algorithm", Journal of Lightwave Technology, vol. 39, No. 22, Nov. 15, 2021, pp. 7274-7280.

* cited by examiner

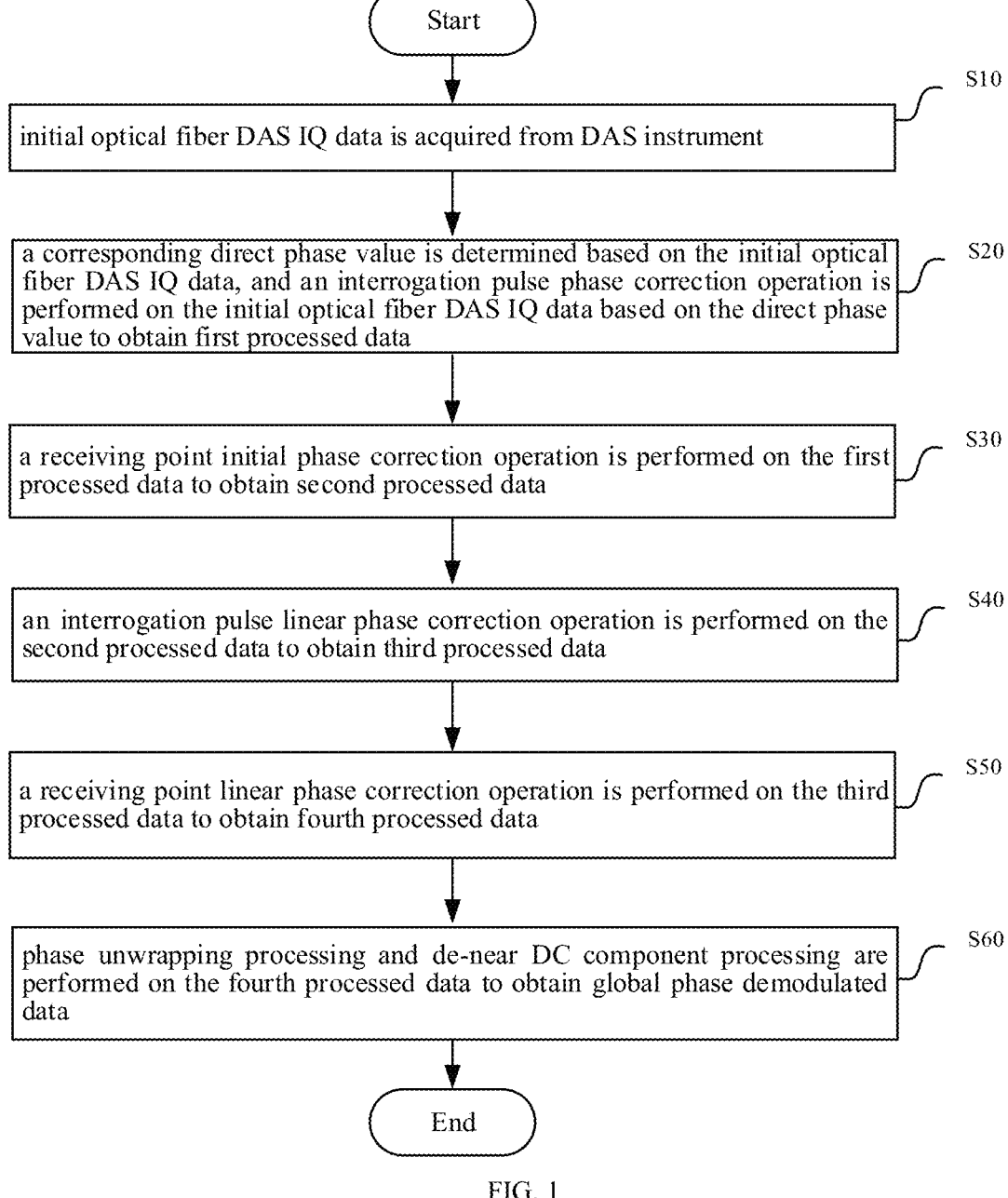

Start initial optical fiber DAS IQ data is acquired from DAS instrument          S10 a corresponding direct phase value is determined based on the initial optical fiber DAS IQ data, and an interrogation pulse phase correction operation is performed on the initial optical fiber DAS IQ data based on the direct phase value to obtain first processed data          S20 a receiving point initial phase correction operation is performed on the first processed data to obtain second processed data          S30 an interrogation pulse linear phase correction operation is performed on the second processed data to obtain third processed data          S40 a receiving point linear phase correction operation is performed on the third processed data to obtain fourth processed data          S50 phase unwrapping processing and de-near DC component processing are performed on the fourth processed data to obtain global phase demodulated data          S60

End

FIG. 1

| initial data acquisition unit | interrogation pulse phase correction unit | receiving point initial phase correction unit |
|---|---|---|
| optical path linear phase correction unit | receiving point linear phase correction unit | processing unit | apparatus for global IQ demodulation

METHOD AND APPARATUS FOR GLOBAL PHASE IN-PHASE/QUADRATURE DEMODULATION OF OPTICAL FIBER DAS DATA

CROSS REFERENCE TO RELATED APPLICATIONS

This application is a National Stage of International Application No. PCT/CN2022/102915 filed Jun. 30, 2022, claiming priority based on Chinese Patent Application No. 202111650237.0 filed Dec. 30, 2021.

FIELD OF THE INVENTION

The present invention relates to the technical field of optical fiber distributed acoustic sensing (DAS) data demodulation, and particularly to a method for global phase In-phase/Quadrature (IQ) Demodulation of optical fiber DAS data, an apparatus for global phase IQ Demodulation of optical fiber DAS data, and a computer-readable storage medium.

BACKGROUND OF THE INVENTION

With the continuous development of technology, optical fiber DAS technology is continuously applied to various fields in life and production. The optical fiber DAS technology is a detection technology based on Rayleigh backscattering (RBS) effect of optical fiber, and is widely used in the technical fields of seismic data acquisition in wells, dam safety monitoring, security and the like.

In the application process, the optical fiber DAS technology acquires phase information of RBS based on IQ phase demodulation through an optical fiber DAS instrument, and the optical fiber serves as both a sensing medium and a transmission medium, acoustic wave vibration or strain information around the optical fiber can be continuously sensed, and related data is recorded through high-density time and space sampling.

In practical applications, however, due to nonlinear effects of laser light propagation in the optical fiber and frequency drift effects, the phase information generates phase drift having an accumulation effect, thus severely affecting the accuracy of phase demodulation, and degrading the accuracy of the optical fiber DAS data. The prior art can overcome the non-linear effects and improve the signal-to-noise ratio by phase differencing and local averaging within the gauge length, however, this phase demodulation method results in the loss of low-wavenumber wavefield information, and the noise level cannot be reduced to the ideal level, therefore, it has caused great troubles for technicians and can not meet the actual needs of technicians at present.

SUMMARY OF THE INVENTION

To overcome the above technical problems existing in the prior art, the embodiments of the present invention provide a method for global phase IQ Demodulation of optical fiber DAS data, which satisfies the actual demands of technicians by analyzing the phase interference factors and the nonlinear phase variation factors in the initial optical fiber DAS data and performing the corresponding optimization process, so as to effectively improve the accuracy of the optical fiber DAS data.

In order to achieve the above objective, an embodiment of the present invention provides a method for global phase IQ Demodulation of optical fiber DAS data, the method including: acquiring initial optical fiber DAS IQ data; determining a corresponding direct phase value based on the initial optical fiber DAS IQ data, and performing an interrogation pulse phase correction operation on the initial optical fiber DAS IQ data based on the direct phase value to obtain first processed data; performing a receiving point initial phase correction operation on the first processed data to obtain second processed data; performing an interrogation pulse linear phase correction operation on the second processed data to obtain third processed data; performing a receiving point linear phase correction operation on the third processed data to obtain fourth processed data; and performing phase unwrapping processing and de-near DC component processing on the fourth processed data to obtain global phase demodulated data.

Optionally, wherein the initial optical fiber DAS IQ data is acquired from a plurality of sensing positions of an optical fiber, determining the corresponding direct phase value based on the initial optical fiber DAS IQ data, and performing the interrogation pulse phase correction operation on the direct phase to obtain the first processed data comprises: determining a preset reference position j0 from the plurality of sensing positions of the optical fiber; acquiring a direct phase value $\omega_0$ corresponding to the preset reference position from the initial optical fiber DAS IQ data, the direct phase value $\omega_0$ being characterized as:

$$\omega_0(i, j) = \arctan\left(\frac{Q(i, j)}{I(i, j)}\right),$$

wherein I (i,j) is an in-phase signal in the initial optical fiber DAS IQ data, Q (i,j) is a quadrature signal in the initial optical fiber DAS IQ data, i is a sampling time, and j is a sampling position; determining an optical source phase changing factor $\psi_s(i)$ based on the direct phase value $\omega_0$, the optical source phase changing factor $\psi_s(i)$ being characterized as:

$$\psi_s(i) = \frac{1}{n1}\sum_{j=j0}^{j0+n1} \omega_0(i, j),$$

wherein n1 is a number of sample points for optical source phase calculation; and performing an interrogation pulse phase correction operation on the initial optical fiber DAS data based on a first preset rule and the interrogation pulse phase changing factor $\psi_s(i)$ to obtain the first processed data $\omega_1(i,j)$, the first preset rule being characterized as: $\omega_1(i,j)=\omega_0(i,j)-\psi_s(i)$.

Optionally, wherein performing the receiving point initial phase correction operation on the first processed data to obtain the second processed data comprises: extracting starting optical fiber DAS data from the first processed data $\omega_1(i,j)$, the starting optical fiber DAS data being generated based on the initial optical fiber DAS IQ data acquired at a starting sampling time without influence of external acoustic waves; determining a receiving point initial phase factor $\psi_r(j)$ based on starting optical fiber DAS IQ data, the receiving point initial phase factor $\psi_r(j)$ being characterized as:

$$\psi_r(j) = \frac{1}{n2}\sum_{i=i0}^{i0+n2} \omega_1(i, j),$$

wherein i0 is an starting sampling time without influence of external acoustic waves, and n2 is a number of sample points for receiving point initial phase calculation; and performing a receiving point initial phase correction operation on the first processed data $\omega_1(i,j)$ based on a second preset rule and the receiving point initial phase factor $\psi_r(j)$ to obtain second processed data $\omega_2(i,j)$, the second preset rule being characterized as: $\omega_2(i,j)=\omega_1(i,j)-\psi_r(j)$.

Optionally, wherein performing the interrogation pulse linear phase correction operation on the second processed data to obtain the third processed data comprises: performing an interrogation pulse linear phase analysis operation based on the second processed data $\omega_2(i,j)$ to obtain interrogation pulse linear phase parameters corresponding to a preset reference position, the interrogation pulse linear phase parameters comprising a first phase intercept $b_i$ and a first gradient $k_i$; and performing an interrogation pulse linear phase correction operation on the second processed data $\omega_2(i,j)$ based on a third preset rule and the interrogation pulse linear phase parameters to obtain third processed data $\omega_3(i,j)$, the third preset rule being characterized as: $\omega_3(i,j)=\omega_2(i,j)-b_i-k_i*(j-j_0)$.

Optionally, wherein performing the receiving point linear phase correction operation on the third processed data to obtain the fourth processed data comprises: acquiring receiving point linear phase parameters corresponding to a start time based on the third processed data $\omega_3(i,j)$, the receiving point linear phase parameters comprising a second phase intercept $b_j$ and a second gradient $k_j$; and performing a receiving point linear phase correction operation on the third processed data $\omega_3(i,j)$ based on a fourth preset rule and the receiving point linear phase parameters to obtain fourth processed data $\omega_4(i,j)$, the fourth preset rule being characterized as: $\omega_4(i,j)=\omega_3(i,j)-b_j-k_j*(i-i_0)$.

Accordingly, the present invention also provides an apparatus for global phase IQ Demodulation of optical fiber DAS data, the apparatus including: an initial data acquisition unit, configured to acquire initial optical fiber DAS IQ data; an interrogation pulse phase correction unit, configured to determine a corresponding direct phase value based on the initial optical fiber DAS IQ data, and performing an interrogation pulse phase correction operation on the initial optical fiber DAS IQ data based on the direct phase value to obtain first processed data; a receiving point initial phase correction unit, configured to perform a receiving point initial phase correction operation on the first processed data to obtain second processed data; an interrogation pulse linear phase correction unit, configured to perform an interrogation pulse linear phase correction operation on the second processed data to obtain third processed data; a receiving point linear phase correction unit, configured to perform a receiving point linear phase correction operation on the third processed data to obtain fourth processed data; and a processing unit, configured to perform phase unwrapping processing and de-near DC component processing on the fourth processed data to obtain global phase demodulated data.

Optionally, wherein the initial optical fiber DAS IQ data is acquired from a plurality of sensing positions of an optical fiber, and the interrogation pulse phase correction unit comprises: a reference position determining module, configured to determine a preset reference position j0 from the plurality of sensing positions of the optical fiber; a reference information acquisition module, configured to obtain a direct phase value $\omega_0$ corresponding to the preset reference position from the initial optical fiber DAS IQ data, the direct phase value $\omega_0$ being characterized as:

$$\omega_0(i,j)=\arctan\left(\frac{Q(i,j)}{I(i,j)}\right),$$

wherein I $(i,j)$ is an in-phase signal in the initial optical fiber DAS IQ data, $Q(i,j)$ is a quadrature signal in the initial optical fiber DAS IQ data, i is a sampling time, and j is a sampling position; an interrogation pulse phase changing factor determination module, configured to determine an interrogation pulse phase changing factor $\psi_s(i)$ based on the direct phase value $\omega_0$, the interrogation pulse phase changing factor $\psi_s(i)$ being characterized as:

$$\psi_s(i)=\frac{1}{n1}\sum\nolimits_{j=j0}^{j0+n1}\omega_0(i,j),$$

wherein n1 is a number of sample points for an interrogation pulse phase calculation; and an interrogation pulse phase correction module, configured to perform an interrogation pulse phase correction operation on the initial optical fiber DAS data based on a first preset rule and the interrogation pulse phase changing factor $\psi_s(i)$ to obtain the first processed data $\omega_1(i,j)$, the first preset rule being characterized as: $\omega_1(i,j)=\omega_0(i,j)-\psi_s(i)$.

Optionally, wherein the receiving point initial phase correction unit comprises: a start data acquisition module, configured to extract starting optical fiber DAS data from the first processed data $\omega_1(i,j)$, the starting optical fiber DAS data being generated based on the initial optical fiber DAS IQ data acquired at a starting sampling time without influence of external acoustic waves; a receiving point initial phase factor determining module, configured to determine a receiving point initial phase factor $\psi_r(j)$ based on the starting optical fiber DAS IQ data, the receiving point initial phase factor $\psi_r(j)$ being characterized as:

$$\psi_r(j)=\frac{1}{n2}\sum\nolimits_{i=i0}^{i0+n2}\omega_1(i,j),$$

wherein i0 is a starting sampling time without influence of external acoustic waves, and n2 is a number of sample points for a receiving point initial phase calculation; and a receiving point initial phase correction module, configured to perform a receiving point initial phase correction operation on the first processed data $\omega_1(i,j)$ based on a second preset rule and the receiving point initial phase factor $\psi_r(j)$ to obtain second processed data $\omega_2(i,j)$, the second preset rule being characterized as: $\omega_2(i,j)=\omega_1(i,j)-\psi_r(j)$.

Optionally, wherein the interrogation pulse linear phase correction unit comprises: an interrogation pulse linear phase analyzing module, configured to perform an interrogation pulse linear phase analysis operation based on the second processed data $\omega_2(i,j)$ to obtain interrogation pulse linear phase parameters corresponding to a preset reference position, the interrogation pulse linear phase parameters comprising a first phase intercept $b_i$ and a first gradient $k_i$; and an interrogation pulse linear phase correction module, configured to perform an interrogation pulse linear phase correction operation on the second processed data $\omega_2(i,j)$ based on a third preset rule and the interrogation pulse linear phase parameters to obtain third processed data $\omega_3(i,j)$, the third preset rule being characterized as: $\omega_3(i,j)=\omega_2(i,j)-b_i-k_i*(j-j_0)$.

Optionally, wherein the receiving point linear phase correction unit comprises: a receiving point linear phase analyzing module, configured to acquire receiving point linear phase parameters corresponding to a start time based on the third processed data $\omega_3(i,j)$, the receiving point linear phase parameters comprising a second phase intercept $b_j$ and a second gradient $k_j$; and a receiving point linear phase correction module, configured to perform a receiving point linear phase correction operation on the third processed data $\omega_3(i,j)$ based on a fourth preset rule and the receiving point linear phase parameters to obtain fourth processed data $\omega_4(i,j)$, the fourth preset rule being characterized as: $\omega_4(i,j)=\omega_3(i,j)-b_j-k_j*(i-i_0)$.

In another aspect, the present invention also provides a computer-readable storage medium, the computer-readable storage medium stores computer programs that, when executed by a processor, cause the processor to implement the method for global phase IQ Demodulation of optical fiber DAS data provided by the present invention.

Through the technical solutions provided by the present invention, the present invention has at least the following technical effects:

by analyzing data influencing factors corresponding to interrogation pulse phase changes, optical fiber refractive index changes, nonlinear phase shifts based directly on the initial optical fiber DAS data collected by a DAS, and adopting the corresponding data optimization processing method, the above problems of the optical fiber DAS data in the acquisition process are effectively overcome, the accuracy of the finally acquired optical fiber DAS data is greatly improved, powerful data support is provided for subsequent accurate data analysis, and the actual demands of technicians are satisfied.

Other features and advantages of embodiments of the present invention will be described in detail in the Detailed Description section that follows.

BRIEF DESCRIPTION OF DRAWINGS

The accompanying drawings are included to provide a further understanding of embodiments of the invention and constitute a part of this specification, and together with the detailed description below serve to explain, but not limit, embodiments of the invention. In the drawings:

FIG. 1 is a flowchart of a specific implementation of a method for global phase IQ Demodulation of optical fiber DAS data provided by an embodiment of the present invention;

DETAILED DESCRIPTION OF THE EMBODIMENTS

A detailed description of embodiments of the invention will now be described with reference to the accompanying drawings. It should be understood that the specific embodiments described herein are intended only to illustrate and explain the embodiments of the present invention, and are not intended to limit the embodiments of the present invention.

The terms "system" and "network" in embodiments of the present invention may be used interchangeably. "A plurality of" means two or more, and in view of this, "a plurality of" may also be understood as "at least two" in embodiments of the present invention. "And/or", which describes the association relationship of associated objects, indicates that three relationships may exist, e.g., A and/or B may indicate that A is alone, A and B are together, and B is alone. In addition, the character "/", unless otherwise specified, generally indicates that contextual objects are in an "OR" relationship. In addition, it is to be understood that in the description of embodiments of the present invention, the words "first", "second" and the like are used only for the purpose of distinguishing description, and are not to be construed as indicating or implying relative importance, nor order.

Referring to FIG. 1, an embodiment of the present invention provides a method for global phase IQ Demodulation of optical fiber DAS data, the method including:

S10) initial optical fiber DAS IQ data is acquired;

S20) a corresponding direct phase value is determined based on the initial optical fiber DAS IQ data, and an interrogation pulse phase correction operation is performed on the initial optical fiber DAS IQ data based on the direct phase value to obtain first processed data;

S30) a receiving point initial phase correction operation is performed on the first processed data to obtain second processed data;

S40) an interrogation pulse linear phase correction operation is performed on the second processed data to obtain third processed data;

S50) a receiving point linear phase correction operation is performed on the third processed data to obtain fourth processed data; and S60) phase unwrapping processing and de-near DC component processing are performed on the fourth processed data to obtain global phase demodulated data.

Figure 2:
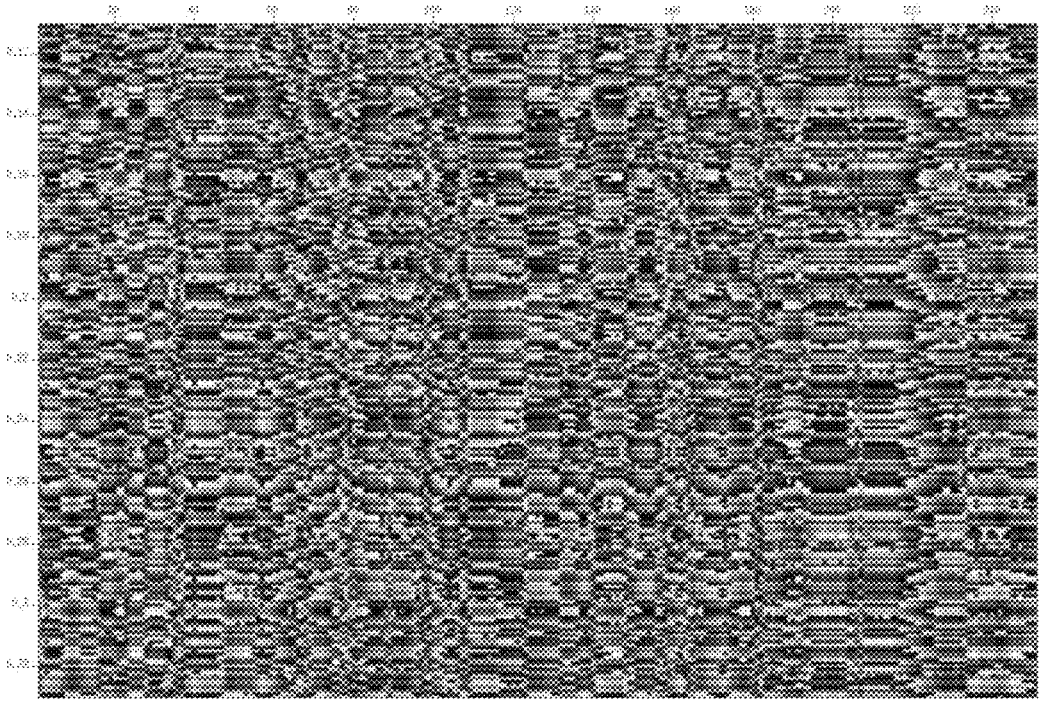
FIG. 2 is a phase diagram of directly demodulated optical fiber information in a method for global phase IQ Demodulation of optical fiber DAS data provided by an embodiment of the present invention.

In an embodiment of the invention, first, an optical fiber is laid onto a position to be detected and the optical fiber is sufficiently coupled with the position to be detected, and a DAS instrument is connected at one end of the optical fiber, the DAS instrument emits a laser pulse, and IQ (In-phase/Quadrature) information of RBS of the optical pulse is acquired by a coherent detection method, and the information is resolved and the corresponding phase information is obtained. However, in the prior art, if the phase information is directly demodulated, then, the obtained optical fiber DAS demodulated information has a large deviation due to the presence of a large number of nonlinear effect. For example, referring to FIG. 2, which is a phase diagram of directly demodulated phase information according to an embodiment of the present invention, the obtained phase information is optimized to solve the technical problem existing in the prior art and improve the accuracy of the optical fiber information.

In one possible embodiment, initial optical fiber DAS IQ data is first acquired, e.g., after the optical fiber emits a light pulse at a certain repetition ratio, the DAS acquires corresponding IQ information I (i, j), Q (i, j), wherein i represents the ith sampling time and j represents the jth sampling position number of the DAS data. In an embodiment of the present invention, the initial optical fiber DAS IQ data includes phase information $\omega_0(i,j)$, which is determined based on the following calculation rule:

$$\omega_0(i, j) = \arctan\!\left(\frac{Q(i, j)}{I(i, j)}\right).$$

After the initial optical fiber DAS IQ data is acquired, the initial optical fiber DAS IQ data is further corrected.

In an embodiment of the present invention, the initial optical fiber DAS IQ data is acquired from a plurality of sensing positions of an optical fiber, and the step that the corresponding direct phase value is determined based on the initial optical fiber DAS IQ data, and the interrogation pulse phase correction operation is performed on the direct phase to obtain the first processed data includes: a preset reference position j0 is determined from the plurality of sensing positions of the optical fiber; a direct phase value $\omega_0$ corresponding to the preset reference position is acquired from initial optical fiber DAS IQ data, the direct phase value $\omega_0$ being characterized as:

$$\omega_0(i, j) = \arctan\!\left(\frac{Q(i, j)}{I(i, j)}\right),$$

wherein I (i,j) is an in-phase signal in the initial optical fiber DAS IQ data, Q (i,j) is a quadrature signal in the initial optical fiber DAS IQ data, i is a sampling time, and j is a sampling position; an optical source phase changing factor $\psi_s(i)$ is determined based on the direct phase value $\omega_0$, the interrogation pulse phase changing factor $\psi_s(i)$ being characterized as:

$$\psi_s(i) = \frac{1}{n1}\sum\nolimits_{j=j0}^{j0+n1} \omega_0(i, j),$$

wherein n1 is a number of sample points for an interrogation pulse phase calculation; and an interrogation pulse phase correction operation is performed on the initial optical fiber DAS data based on a first preset rule and the interrogation pulse phase changing factor to obtain the first processed data $\omega_1(i,j)$, the first preset rule being characterized as: $\omega_1(i,j)=\omega_0(i,j)-\psi_s(i)$.

Figure 3:
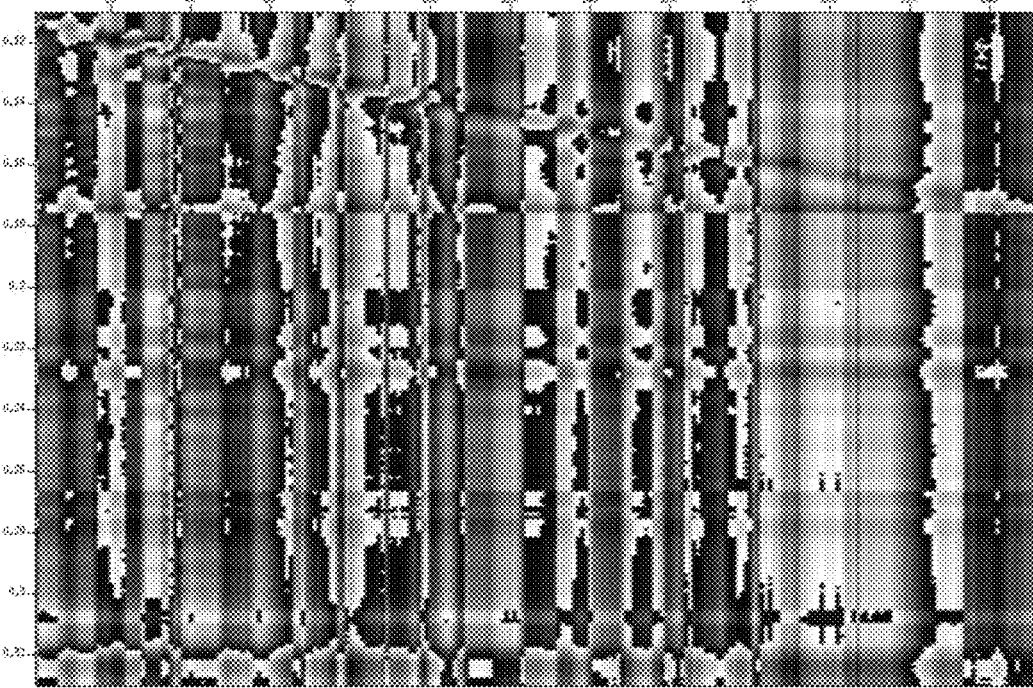
FIG. 3 is a schematic diagram of optical fiber DAS IQ data after performing interrogation pulse phase correction in a method for global phase IQ Demodulation of optical fiber DAS data provided by an embodiment of the present invention.

In one possible embodiment, after acquiring the initial optical fiber DAS IQ data acquired from a plurality of sensing positions of the optical fiber, first, a preset reference position is determined from the plurality of sensing positions of the optical fiber, for example, a middle reference position j0 of the optical fiber to be measured may be selected as the preset reference position, the data collected at each sampling instant are then counted at the pre-set reference position, a changing factor $\psi_s(i)$ of the interrogation pulse phase of the optical fiber over time is obtained, this changing factor $\psi_s(i)$ can be determined by taking the mean (or median) of multiple points:

$$\psi_s(i) = \frac{1}{n1}\sum\nolimits_{j=j0}^{j0+n1} \omega_0(i, j),$$

wherein n1 is a number of sample points for an interrogation pulse phase calculation, then the initial optical fiber DAS IQ data can be subjected to the interrogation pulse phase correction operation according to the first preset rule to obtain the first processed data $\omega_1(i,j)$, the first preset rule is characterized as: $\omega_1(i,j)=\omega_0(i,j)-\psi_s(i)$. Please refer to FIG. 3, which is a schematic diagram of the optical fiber DAS IQ data after performing interrogation pulse phase correction provided by an embodiment of the present invention.

In an embodiment of the invention, the interrogation pulse phase changing factor of the optical fiber is obtained by analyzing the initial optical fiber DAS data, and performing phase correction on the initial optical fiber DAS data according to the interrogation pulse phase changing factor of the optical fiber, the phase information after preliminary correction is obtained, the influence caused by the interrogation pulse phase change on the phase information can be effectively eliminated, and the accuracy of the data is improved. In order to further eliminate influencing factors in the initial optical fiber DAS IQ data and improve data accuracy, the first processed data is subjected to a further receiving point initial phase correction operation.

In an embodiment of the present invention, the step that the receiving point initial phase correction operation is performed on the first processed data to obtain the second processed data includes: starting optical fiber DAS data is extracted from the first processed data $\omega_1(i,j)$, the starting optical fiber DAS data being generated based on the initial optical fiber DAS IQ data acquired at a starting sampling time without influence of external acoustic waves; a receiving point initial phase factor $\psi_r(j)$ is determined based on the starting optical fiber DAS IQ data, the receiving point initial phase factor $\psi_r(j)$ being characterized as:

$$\psi_r(j) = \frac{1}{n2}\sum\nolimits_{i=i0}^{i0+n2} \omega_1(i, j),$$

wherein i0 is an starting sampling time without influence of external acoustic waves, and n2 is a number of sample points for a receiving point initial phase calculation; and a receiving point initial phase correction operation is performed on the first processed data $\omega_1(i,j)$ based on a second preset rule and the receiving point initial phase factor $\psi_r(j)$ to obtain second processed data $\omega_2(i,j)$, the second preset rule being characterized as: $\omega_2(i,j)=\omega_1(i,j)-\psi_r(j)$.

Figure 4:
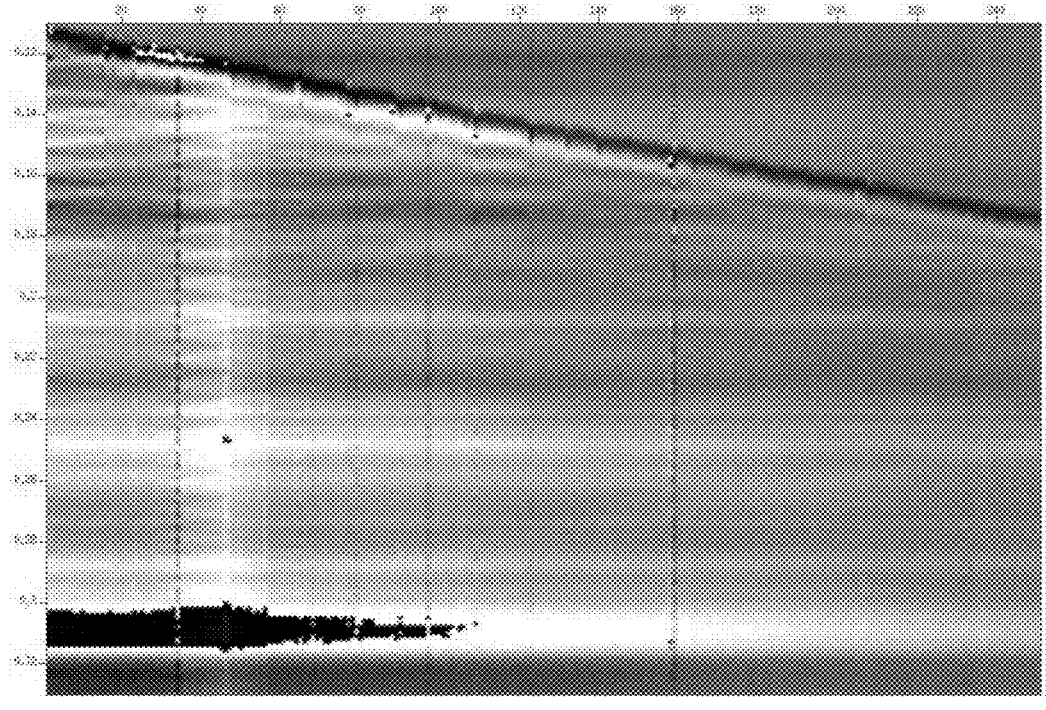
FIG. 4 is a schematic diagram of optical fiber DAS data after performing receiving point initial phase correction in a method for global phase IQ Demodulation of optical fiber DAS data provided by an embodiment of the present invention.

In one possible embodiment, after acquiring the first processed data $\omega_1(i,j)$, the starting optical fiber DAS data is extracted from the first processed data $\omega_1(i,j)$, and the initial optical fiber DAS IQ data is obtained from the outside without the influence of external acoustic waves, thus, the initial optical fiber DAS IQ data includes initial data without the influence of external acoustic waves, and correspondingly, the first processed data $\omega_1(i,j)$ also includes corresponding starting optical fiber DAS data, which is the optical fiber DAS data collected at time i0 without the influence of external acoustic waves. After extracting the starting optical fiber DAS data from the first processed data $\omega_1(i,j)$, a receiving point initial phase factor $\psi_r(j)$ for each detection position is determined according to the starting optical fiber DAS data, the receiving point initial phase factor $\psi_r(j)$ can be determined by taking the mean (or median) of multiple points:

$$\psi_r(j) = \frac{1}{n2}\sum_{i=i0}^{i0+n2}\omega_1(i, j),$$

wherein i0 is the starting sampling time without the influence of external acoustic waves, and n2 is the number of sample points for the receiving point initial phase calculation, at this time, the receiving point initial phase correction operation is further performed on the first processed data $\omega_1(i,j)$ according to the second preset rule and the receiving point initial phase factor $\psi_r(j)$, the second preset rule can be characterized as: $\omega_2(i,j)=\omega_1(i,j)-\psi_r(j)$, according to the receiving point initial phase correction operation, the corresponding second processed data $\omega_2(i,j)$ is obtained. At this time, the second processed data $\omega_2(i,j)$ is further subjected to an interrogation pulse linear phase correction process. Please refer to FIG. 4, which is a schematic diagram of the optical fiber DAS data after performing receiving point initial phase correction according to an embodiment of the present invention.

In an embodiment of the present invention, the step that the interrogation pulse linear phase correction operation is performed on the second processed data to obtain the third processed data includes: an interrogation pulse linear phase analysis operation is performed based on the second processed data $\omega_2(i,j)$ to obtain interrogation pulse linear phase parameters corresponding to a preset reference position; and an interrogation pulse linear phase correction operation is performed on the second processed data $\omega_2(i,j)$ based on a third preset rule and the interrogation pulse linear phase parameters to obtain third processed data $\omega_3(i,j)$, the third preset rule being characterized as: $\omega_3(i,j)=\omega_2(i,j)-b_i-k_i*(j-j_0)$.

Figure 5:
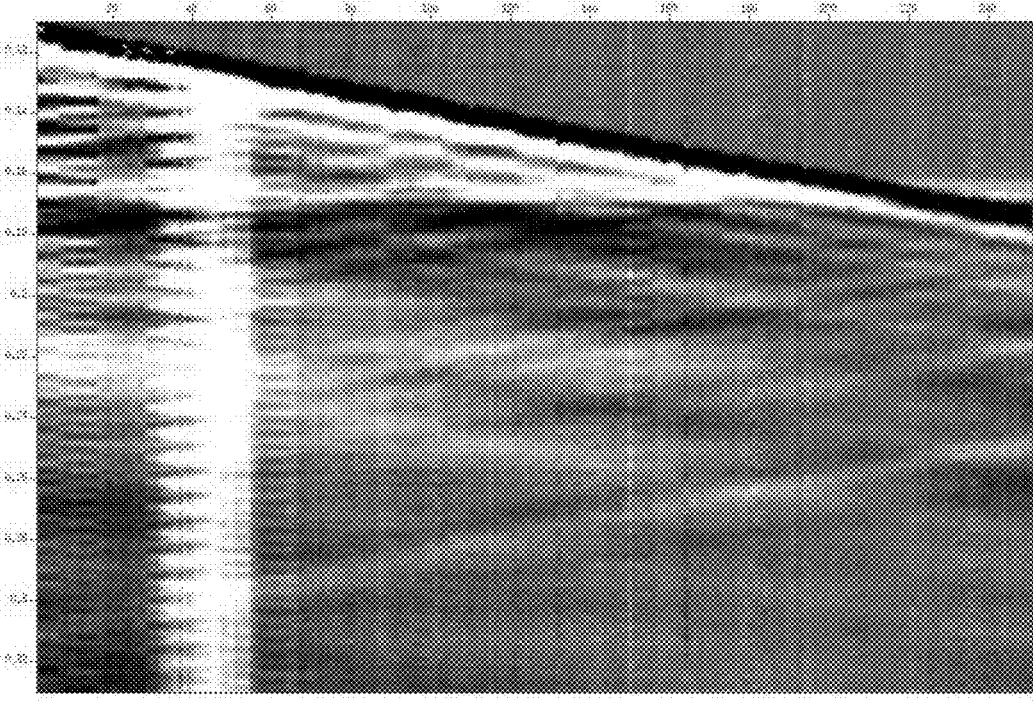
FIG. 5 is a schematic diagram of optical fiber DAS data after performing interrogation pulse and receiving point linear phase correction in a method for global phase IQ Demodulation of optical fiber DAS data provided by an embodiment of the present invention.

In one possible embodiment, after acquiring the second processed data $\omega_2(i,j)$ described above, a multi-scale phase linear variation sweep is performed around the j0 position for each time i to obtain the interrogation pulse linear phase parameters near the j0 position, the interrogation pulse linear phase parameters include but are not limited to a phase intercept $b_i$ and a gradient $k_i$, at this time, the second processed data $\omega_2(i,j)$ is subjected to the interrogation pulse linear phase correction operation according to the third preset rule and the above interrogation pulse linear phase parameters to obtain the third processed data $\omega_3(i,j)$, the third preset rule can be characterized as: $\omega_3(i,j)=\omega_2(i,j)-b_i-k_i*(j-j_0)$. At this time, the receiving point linear phase correction operation is further performed on the third processed data $\omega_3(i,j)$. Please refer to FIG. 5, which is a schematic diagram of the optical fiber DAS data after performing interrogation pulse and receiving point linear phase correction according to an embodiment of the present invention.

In an embodiment of the present invention, the step that the receiving point linear phase correction operation is performed on the third processed data to obtain the fourth processed data includes: receiving point linear phase parameters are acquired corresponding to a start time based on the third processed data $\omega_3(i,j)$, the receiving point linear phase parameters including a second phase intercept $b_j$ and a second gradient $k_j$; and a receiving point linear phase correction operation is performed on the third processed data $\omega_3(i,j)$ based on a fourth preset rule and the receiving point linear phase parameters to obtain fourth processed data $\omega_4(i,j)$, the fourth preset rule being characterized as: $\omega_4(i,j)=\omega_3(i,j)-b_j-k_j*(i-i_0)$.

In one possible embodiment, from the third processed data $\omega_3(i,j)$, a multi-scale phase linear variation sweep is performed for each detection position around the time i0 to obtain the receiving point linear phase parameters for each detection position around the time i0, for example, the receiving point linear phase parameters include but are not limited to a phase intercept bj and a gradient kj, at this time, the receiving point linear phase correction operation is further performed on the third processed data $\omega_3(i,j)$ by the fourth preset rule and the above receiving point linear phase parameters, thereby obtaining the corresponding fourth processed data $\omega_4(i,j)$, the fourth preset rule can be characterized as: $\omega_4(i,j)=\omega_3(i,j)-b_j-k_j-(i-i_0)$. At this point, the data correction process on the initial optical fiber DAS IQ data is completed, and the accurate optical fiber DAS data is obtained.

It is readily known to those skilled in the art that they can, according to actual requirements, continue to repeat the above steps for subsequently acquired optical fiber DAS data, for example, the optical fiber DAS data obtained based on the excitation of the artificial seismic source or the passive monitoring may be collected for the above optimization, or the optical fiber DAS data may be repeatedly collected and the above optimization may be performed to obtain more accurate corrected optical fiber DAS data, all of which fall within the scope of the embodiments of the present invention, and will not be described in more detail herein.

In the embodiments of the invention, the interrogation pulse phase factor which changes with time and the different receiving point initial phase factors in the initial optical fiber DAS IQ data are analyzed, the optical fiber DAS data is optimized according to the phase factors, and the linear parameters in the optical fiber DAS data acquisition process are obtained and the linear phase correction is carried out on the optical fiber DAS data, thereby overcoming the influence of the interrogation pulse phase change on the accuracy of the optical fiber DAS data, further overcoming the influence of the optical fiber refractive index change, nonlinear phase drift and other problems on the accuracy of the optical fiber DAS data, greatly improving the accuracy of the final optical fiber DAS data, and meeting the actual requirements of technicians.

However, the optical fiber DAS data processed as described above are raw optical fiber DAS data, and thus further conversion optimization processing is required to obtain optical fiber DAS phase-demodulated data that can be used.

In an embodiment of the present invention, the step that phase unwrapping processing is performed on the fourth processed data to obtain global phase demodulated data includes: a phase unwrapping operation is performed on the fourth processed data $\omega_4(i,j)$ to obtain corresponding acoustic wavefield data; de-near DC component processing is performed on the acoustic wavefield data to obtain global phase demodulated data.

In one possible embodiment, the phase unwrapping operation is further performed on the acquired fourth processed data $\omega_4(i,j)$ acoustic wave to obtain the required acoustic wavefield data. And in order to further eliminate low frequency noise after linear phase correction, the de-near DC component processing is also performed on the acoustic wavefield data to obtain true global demodulation phase data. Please refer to FIG. 6, which is a schematic diagram of the optical fiber DAS data after performing the de-near DC component processing according to an embodiment of the present invention.

In the embodiment of the present invention, by analyzing noise or influential factors in the optical fiber DAS data according to the interferometry detection process of the optical fiber DAS data, and performing precise data optimization processing, the accurate optical fiber DAS data is obtained, thus providing powerful data support for subsequent data processing and application.

Hereinafter, an apparatus for global phase IQ Demodulation of optical fiber DAS data according to an embodiment of the present invention will be described with reference to the accompanying drawings.

Figures 6, 7:
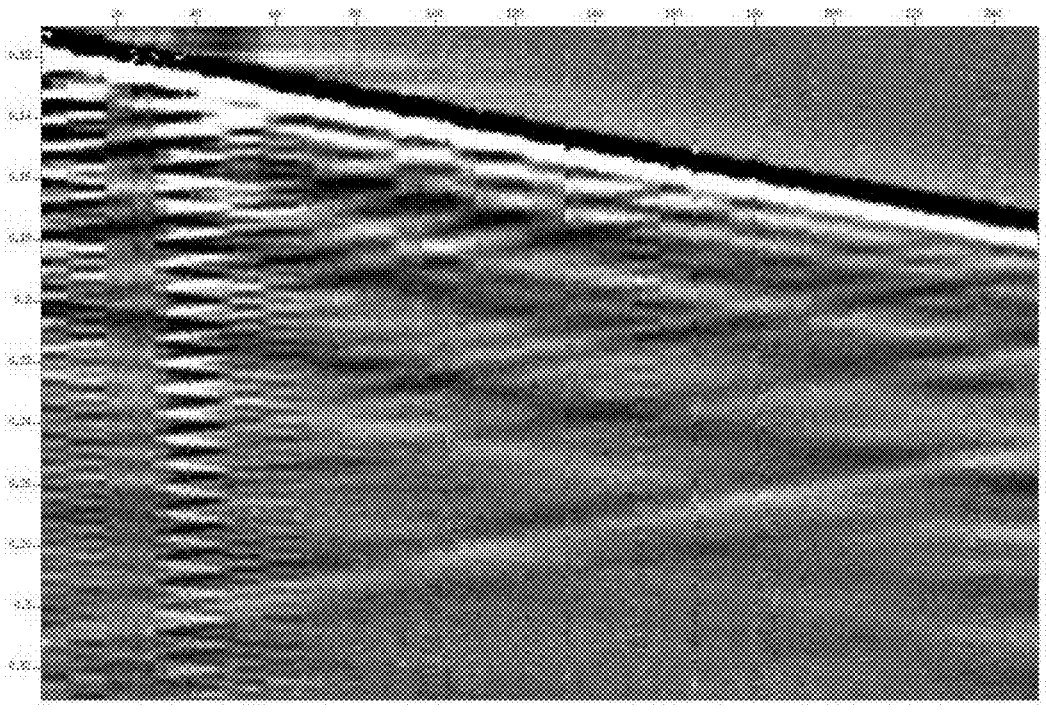
FIG. 6 is a schematic diagram of optical fiber DAS data after performing de-near DC component processing in a method for global phase IQ Demodulation of optical fiber DAS data provided by an embodiment of the present invention.
FIG. 7 is a schematic structural diagram of an apparatus for global phase IQ Demodulation of optical fiber DAS data provided by an embodiment of the present invention.

Referring to FIG. 7, based on the same inventive concept, an embodiment of the present invention provides an apparatus for global phase IQ Demodulation of optical fiber DAS data, the apparatus including: an initial data acquisition unit, configured to acquire initial optical fiber DAS IQ data; an interrogation pulse phase correction unit, configured to determine a corresponding direct phase value based on the initial optical fiber DAS IQ data, performing an interrogation pulse phase correction operation on the initial optical fiber DAS IQ data based on the direct phase value to obtain first processed data; a receiving point initial phase correction unit, configured to perform a receiving point initial phase correction operation on the first processed data to obtain second processed data; an interrogation pulse linear phase correction unit, configured to perform an interrogation pulse linear phase correction operation on the second processed data to obtain third processed data; a receiving point linear phase correction unit, configured to perform a receiving point linear phase correction operation on the third processed data to obtain fourth processed data; and a processing unit, configured to perform phase unwrapping processing and de-near DC component processing on the fourth processed data to obtain global phase demodulated data.

In an embodiment of the present invention, the initial optical fiber DAS IQ data is acquired from a plurality of sensing positions of an optical fiber, and the interrogation pulse phase correction unit includes: a reference position determining module, configured to determine a preset reference position j0 from the plurality of sensing positions of the optical fiber; a reference information acquisition module, configured to acquire a direct phase value $\omega_0$ corresponding to the preset reference position from the initial optical fiber DAS IQ data, the direct phase value $\omega_0$ being characterized as:

$$\omega_0(i, j) = \arctan\left(\frac{Q(i, j)}{I(i, j)}\right),$$

wherein I $(i,j)$ is an in-phase signal in the initial optical fiber DAS IQ data, Q $(i,j)$ is a quadrature signal in the initial optical fiber DAS IQ data, i is a sampling time, and j is a sampling position; an interrogation pulse phase changing factor determination module, configured to determine an optical source phase changing factor $\psi_s(i)$ based on the direct phase value $\omega_0$, the optical source phase changing factor $\psi_s(i)$ being characterized as:

$$\psi_s(i) = \frac{1}{n1}\sum_{j=j0}^{j0+n1}\omega_0(i, j),$$

wherein n1 is a number of sample points for an optical source phase calculation; and an interrogation pulse phase correction module, configured to perform an interrogation pulse phase correction operation on the initial optical fiber DAS data based on a first preset rule and the interrogation pulse phase changing factor $\psi_s(i)$ to obtain the first processed data $\omega_1(i,j)$, the first preset rule being characterized as: $\omega_1(i,j)=\omega_0(i,j)-\psi_s(i)$.

In an embodiment of the present invention, the receiving point initial phase correction unit includes: a start data acquisition module, configured to extract starting optical fiber DAS data from the first processed data $\omega_1(i,j)$, the starting optical fiber DAS data being generated based on the initial optical fiber DAS IQ data acquired at a starting sampling time without influence of external acoustic waves; a receiving point initial phase factor determining module, configured to determine a receiving point initial phase factor $\psi_r(j)$ based on the starting optical fiber DAS IQ data, the receiving point initial phase factor $\psi_r(j)$ being characterized as:

$$\psi_r(j) = \frac{1}{n2}\sum_{i=i0}^{i0+n2}\omega_1(i, j),$$

wherein i0 is an starting sampling time without influence of external acoustic waves, and n2 is a number of sample points for a receiving point initial phase calculation; and a receiving point initial phase correction module, configured to perform a receiving point initial phase correction operation on the first processed data $\omega_1(i,j)$ based on a second preset rule and the receiving point initial phase factor $\psi_r(j)$ to obtain second processed data $\omega_2(i,j)$, the second preset rule being characterized as: $\omega_2(i,j)=\omega_1(i,j)-\psi_r(j)$.

In an embodiment of the present invention, the interrogation pulse linear phase correction unit includes: an interrogation pulse linear phase analyzing module, configured to perform an interrogation pulse linear phase analysis operation based on the second processed data $\omega_2(i,j)$ to obtain interrogation pulse linear phase parameters corresponding to a preset reference position, the interrogation pulse linear phase parameters including a first phase intercept $b_i$ and a first gradient $k_i$; and an interrogation pulse linear phase correction module, configured to perform an interrogation pulse linear phase correction operation on the second processed data $\omega_2(i,j)$ based on a third preset rule and the interrogation pulse linear phase parameters to obtain third processed data $\omega_3(i,j)$, the third preset rule being characterized as: $\omega_3(i,j)=\omega_2(i,j)-b_i-k_i*(j-j_0)$.

In an embodiment of the present invention, the receiving point linear phase correction unit includes: a receiving point linear phase analyzing module, configured to acquire receiving point linear phase parameters corresponding to a start time based on the third processed data $\omega_3(i,j)$, the receiving point linear phase parameters including a second phase intercept $b_j$ and a second gradient $k_j$; and a receiving point linear phase correction module, configured to perform a receiving point linear phase correction operation on the third processed data $\omega_3(i,j)$ based on a fourth preset rule and the receiving point linear phase parameters to obtain fourth processed data $\omega_4(i,j)$, the fourth preset rule being characterized as: $\omega_4(i,j)=\omega_3(i,j)-b_j-k_j*(i-i_0)$.

In an embodiment of the present invention, the processing unit is specifically configured to: perform the phase unwrapping operation on the fourth processed data $\omega_4(i,j)$ to obtain corresponding acoustic wavefield data; perform de-near DC component processing on the acoustic wavefield data to obtain the global phase demodulated data.

Further, an embodiment of the present invention further provides a computer-readable storage medium, the computer-readable storage medium stores computer programs that, when executed by a processor, cause the processor to implement the method for global phase IQ Demodulation of optical fiber DAS data according to the present invention.

Optional implementations of embodiments of the present invention are described in detail above in conjunction with the accompanying drawings, however, the embodiments of the present invention are not limited to the specific details in the above embodiments, and many simple variations can be made to the technical solutions of the embodiments of the present invention within the scope of the technical idea of the embodiments of the present invention, which all belong to the protection scope of the embodiments of the present invention.

It is further noted that the various specific features described in the above detailed implementations can be combined in any suitable manner without contradiction. In order to avoid unnecessary repetition, the embodiments of the present invention are not further described in various possible combinations.

Those skilled in the art will appreciate that all or part of the steps in the method implementing the embodiments described above may be performed by instructing related hardware through a program, the program is stored in a storage medium and includes instructions for causing a single-chip, chip or processor to perform all or part of the steps of the method according to the various embodiments of the present application. The aforementioned storage medium includes a USB flash disk, a removable hard disk, a Read-Only Memory (ROM), a Random Access Memory (RAM), a magnetic disk, or an optical disk and other media capable of storing program codes.

In addition, any combination between the various embodiments of the present invention may be made, as long as it does not depart from the idea of the present embodiments, which should be considered as disclosed in the present embodiments as well.

The invention claimed is:

1. A method for global phase IQ Demodulation of optical fiber DAS data, comprising:

acquiring initial optical fiber DAS IQ data;

determining a corresponding direct phase value based on the initial optical fiber DAS IQ data, and performing an interrogation pulse phase correction operation on the initial optical fiber DAS IQ databased on the direct phase value to obtain first processed data;

performing a receiving point initial phase correction operation on the first processed data to obtain second processed data;

performing an interrogation pulse linear phase correction operation on the second processed data to obtain third processed data;

performing a receiving point linear phase correction operation on the third processed data to obtain fourth processed data; and performing phase unwrapping processing and de-near DC component processing on the fourth processed data to obtain global phase demodulated data, wherein the initial optical fiber DAS IQ data is acquired from a plurality of sensing positions of an optical fiber, determining the corresponding direct phase value based on the initial optical fiber DAS IQ data, and performing the interrogation pulse phase correction operation on the direct phase to obtain the first processed data comprises:

determining a preset reference position j0 from the plurality of sensing positions of the optical fiber;

acquiring a direct phase value $\omega_0$ corresponding to the preset reference position from the initial optical fiber DAS IQ data, the direct phase value $\omega_0$ being characterized as:

$$\omega_0(i,j) = \arctan\left(\frac{Q(i,j)}{I(i,j)}\right),$$

wherein I (i,j) is an in-phase signal in the initial optical fiber DAS IQ data, Q(i, j) is a quadrature signal in the initial optical fiber DAS IQ data, i is a sampling time, and j is a sampling position;

determining an interrogation pulse phase changing factor $\psi_s(i)$ based on the direct phase value $\omega_0$, the interrogation pulse phase changing factor $\psi_s(i)$ being characterized as:

$$\psi_s(i) = \frac{1}{n1}\sum_{j=j0}^{j0+n1}\omega_0(i,j),$$

wherein n1 is a counted number of sample points of an interrogation pulse phase; and performing an interrogation pulse phase correction operation on the initial optical fiber DAS data based on a first preset rule and the interrogation pulse phase changing factor $\psi_s(i)$ to obtain the first processed data $\omega_1(i,j)$, the first preset rule being characterized as: $\omega_1(i,j)=\omega_0(i,j)-\psi_s(i)$.

2. The method of claim 1, wherein performing the receiving point initial phase correction operation on the first processed data to obtain the second processed data comprises:

extracting starting optical fiber DAS data from the first processed data $\omega_1(i,j)$, the starting optical fiber DAS data being generated based on the initial optical fiber DAS IQ data acquired at a starting sampling time without influence of external acoustic waves;

determining a receiving point initial phase factor $\psi_r(j)$ based on starting optical fiber DAS IQ data, the receiving point initial phase factor $\psi_r(j)$ being characterized as:

$$\psi_r(j) = \frac{1}{n2}\sum_{i=i0}^{i0+n2}\omega_1(i,j),$$

wherein i0 is an starting sampling time without influence of external acoustic waves, and n2 is a number of sample points for a receiving point initial phase calculation; and performing a receiving point initial phase correction operation on the first processed data $\omega_1(i,j)$ based on a second preset rule and the receiving point initial phase

15 factor $\psi_r(j)$ to obtain second processed data $\omega_2(i,j)$, the second preset rule being characterized as: $\omega_2(i,j)=\omega_1(i,j)-\psi_r(j)$.

3. The method of claim 2, wherein performing the interrogation pulse linear phase correction operation on the second processed data to obtain the third processed data comprises:

performing an interrogation pulse linear phase analysis operation based on the second processed data $\omega_2(i,j)$ to obtain interrogation pulse linear phase parameters corresponding to a preset reference position, the interrogation pulse linear phase parameters comprising a first phase intercept $b_i$ and a first gradient $k_i$; and performing an interrogation pulse linear phase correction operation on the second processed data $\omega_2(i,j)$ based on a third preset rule and the interrogation pulse linear phase parameters to obtain third processed data $\omega_3(i,j)$, the third preset rule being characterized as: $\omega_3(i,j)=\omega_2(i,j)-b_i-k_i*(j-j_0)$.

4. The method of claim 3, wherein performing the receiving point linear phase correction operation on the third processed data to obtain the fourth processed data comprises:

acquiring receiving point linear phase parameters corresponding to a start time based on the third processed data $\omega_3(i,j)$, the receiving point linear phase parameters comprising a second phase intercept $b_j$ and a second gradient $k_j$; and performing a receiving point linear phase correction operation on the third processed data $\omega_3(i,j)$ based on a fourth preset rule and the receiving point linear phase parameters to obtain fourth processed data $\omega_4(i,j)$, the fourth preset rule being characterized as: $\omega_4(i,j)=\omega_3(i,j)-b_j-k_j*(i-i_0)$.

5. An apparatus for global phase IQ Demodulation of optical fiber DAS data, comprising:

an initial data acquisition unit, configured to acquire initial optical fiber DAS IQ data;

an interrogation pulse phase correction unit, configured to determine a corresponding direct phase value based on the initial optical fiber DAS IQ data, and performing an interrogation pulse phase correction operation on the initial optical fiber DAS IQ data based on the direct phase value to obtain first processed data;

a receiving point initial phase correction unit, configured to perform a receiving point initial phase correction operation on the first processed data to obtain second processed data;

an interrogation pulse linear phase correction unit, configured to perform an interrogation pulse linear phase correction operation on the second processed data to obtain third processed data;

a receiving point linear phase correction unit, configured to perform a receiving point linear phase correction operation on the third processed data to obtain fourth processed data; and a processing unit, configured to perform phase unwrapping processing and de-near DC component processing on the fourth processed data to obtain global phase demodulated data, wherein the initial optical fiber DAS IQ data is acquired from a plurality of sensing positions of an optical fiber, and the interrogation pulse phase correction unit comprises:

a reference position determining module, configured to determine a preset reference position j0 from the plurality of sensing positions of the optical fiber;

16 a reference information acquisition module, configured to acquire a direct phase value $\omega_0$ corresponding to the preset reference position from the initial optical fiber DAS IQ data, the direct phase value $\omega_0$ being characterized as:

$$\omega_0(i, j) = \arctan\left(\frac{Q(i, j)}{I(i, j)}\right),$$

wherein I $(i,j)$ is an in-phase signal in the initial optical fiber DAS IQ data, Q $(i,j)$ is a quadrature signal in the initial optical fiber DAS IQ data, i is a sampling time, and j is a sampling position;

an interrogation pulse phase changing factor determination module, configured to determine an interrogation pulse phase changing factor $\psi_s(i)$ based on the direct phase value $\omega_0$, the interrogation pulse phase changing factor $\psi_s(i)$ being characterized as:

$$\psi_s(i) = \frac{1}{n1}\sum\nolimits_{j=j0}^{j0+n1} \omega_0(i, j),$$

wherein n1 is a counted number of sample points of an interrogation pulse phase; and an interrogation pulse phase correction module, configured to perform an interrogation pulse phase correction operation on the initial optical fiber DAS data based on a first preset rule and the interrogation pulse phase changing factor $\psi_s(i)$ to obtain the first processed data $\omega_1(i,j)$, the first preset rule being characterized as: $\omega_1(i,j)=\omega_0(i,j)-\psi_s(i)$.

6. The apparatus of claim 5, wherein the receiving point initial phase correction unit comprises:

a start data acquisition module, configured to extract starting optical fiber DAS data from the first processed data $\omega_1(i,j)$, the starting optical fiber DAS data being generated based on the initial optical fiber DAS IQ data acquired at a starting sampling time without influence of external acoustic waves;

a receiving point initial phase factor determining module, configured to determine a receiving point initial phase factor $\psi_r(j)$ based on the starting optical fiber DAS IQ data, the receiving point initial phase factor $\psi_r(j)$ being characterized as:

$$\psi_r(j) = \frac{1}{n2}\sum\nolimits_{i=i0}^{i0+n2} \omega_1(i, j),$$

wherein i0 is an starting sampling time without influence of external acoustic waves, and n2 is a number of sample points for a receiving point initial phase calculation; and a receiving point initial phase correction module, configured to perform a receiving point initial phase correction operation on the first processed data $\omega_1(i,j)$ based on a second preset rule and the receiving point initial phase factor $$\psi_r(j) = \frac{1}{n2}\sum\nolimits_{i=i0}^{i0+n2} \omega_1(i, j)$$

to obtain second processed data $\omega_2(i,j)$, the second preset rule being characterized as: $\omega_2(i,j)=\omega_1(i,j)-\psi_r(j)$.

17

7. The apparatus of claim 6, wherein the interrogation pulse linear phase correction unit comprises:

an interrogation pulse linear phase analyzing module, configured to perform an interrogation pulse linear phase analysis operation based on the second processed data $\omega_2(i,j)$ to obtain interrogation pulse linear phase parameters corresponding to a preset reference position, the interrogation pulse linear phase parameters comprising a first phase intercept $b_i$ and a first gradient $k_i$; and an interrogation pulse linear phase correction module, configured to perform an interrogation pulse linear phase correction operation on the second processed data $\omega_2(i,j)$ based on a third preset rule and the interrogation pulse linear phase parameters to obtain third processed data $\omega_3(i,j)$, the third preset rule being characterized as: $\omega_3(i,j)=\omega_2(i,j)-b_i-k_i*(j-j_0)$.

8. The apparatus of claim 7, wherein the receiving point linear phase correction unit comprises:

18 a receiving point linear phase analyzing module, configured to acquire receiving point linear phase parameters corresponding to a start time based on the third processed data $\omega_3(i,j)$, the receiving point linear phase parameters comprising a second phase intercept $b_j$ and a second gradient $k_j$; and a receiving point linear phase correction module, configured to perform a receiving point linear phase correction operation on the third processed data $\omega_3(i,j)$ based on a fourth preset rule and the receiving point linear phase parameters to obtain fourth processed data $\omega_4(i,j)$, the fourth preset rule being characterized as: $\omega_4(i,j)=\omega_3(i,j)-b_j-k_j*(i-i_0)$.

9. A non-transitory computer-readable storage medium, the non-transitory computer-readable storage medium stores computer programs that, when executed by a processor, cause the processor to implement the method for global phase IQ Demodulation of optical fiber DAS data according to claim 1.

*     *     *     *     *